US 6,611,401 B1

(12) United States Patent
Burga et al.

(10) Patent No.: US 6,611,401 B1
(45) Date of Patent: Aug. 26, 2003

(54) GLIDE HEAD WITH A TRANSVERSE CONTACT RAIL

(75) Inventors: Margelus A. Burga, Santa Clara, CA (US); Alexander A. Burga, San Jose, CA (US)

(73) Assignee: Marburg Technology, Inc., Milpitas, CA (US)

( * ) Notice: Subject to any disclaimer, the term of this patent is extended or adjusted under 35 U.S.C. 154(b) by 184 days.

(21) Appl. No.: 09/713,470

(22) Filed: Nov. 14, 2000

Related U.S. Application Data

(63) Continuation-in-part of application No. 09/382,279, filed on Aug. 25, 1999, which is a continuation of application No. 08/831,878, filed on Apr. 2, 1997, now Pat. No. 5,963,396.

(51) Int. Cl.⁷ .............................. G11B 5/60; G01B 5/28
(52) U.S. Cl. ............................... 360/236.9; 360/236.5; 73/105
(58) Field of Search ................... 73/105; 360/236.5, 360/236.8, 236.9, 235.7

(56) References Cited

U.S. PATENT DOCUMENTS

| | | |
|---|---|---|
| 3,855,625 A | 12/1974 | Garnier et al. ............. 360/103 |
| 4,532,802 A | 8/1985 | Yeack-Scranton et al. .... 73/432 |

(List continued on next page.)

OTHER PUBLICATIONS

Chhabra, D., et al., "Air Bearing Design Considerations for Constant Fly Height Applications," IEEE Transactions of Magnetics, vol. 30, No. 2, Mar. 1994, pp. 417–423.

Primary Examiner—Brian E. Miller
(74) Attorney, Agent, or Firm—Silicon Valley Patent Group LLP; Michael J. Halbert (57) ABSTRACT

A glide head includes two rails that run from the leading end to the trailing end of the glide head and a transverse contact rail that is orientated orthogonally to the two rails and is located at the trailing end of the glide head. The two rails may contact the transverse contact rail or one or both may not extend to the transverse contact rail. In addition, the channel region defined between the two rails and the wing, if used, may be tapered so that they merge with the bottom surface of the transverse contact rail. The transverse contact rail may extend beyond the two rails. The glide head flies with a positive pitch which causes the transverse contact rail to be the closest area on the glide head to the surface of a rotating disk being tested. Thus, the mechanical energy is greatest when the transverse contact rail contacts a defect on a disk, and thus the transverse contact rail is the active rail. Because the transverse contact rail extends across the width of the glide head, the glide head may be stepped by large amounts when testing a disk, which decreases testing time and increases throughput. In addition, the transverse contact rail may extend from one side of the glide head to the other, and thus, the glide head may be used to test both the inside diameter and outside diameter of a disk.

15 Claims, 6 Drawing Sheets

U.S. PATENT DOCUMENTS

| | | | |
|---|---|---|---|
| 4,635,139 A | 1/1987 | Nguyen et al. | 368/25 |
| 4,734,803 A | 3/1988 | Nishihira | 360/103 |
| 4,894,740 A | 1/1990 | Chhabra et al. | 360/103 |
| 4,928,195 A | 5/1990 | Ezaki et al. | 360/103 |
| 5,086,360 A | 2/1992 | Smith et al. | 360/103 |
| 5,128,822 A | 7/1992 | Chapin et al. | 360/103 |
| 5,237,861 A | 8/1993 | Suda et al. | 73/105 |
| 5,287,235 A | 2/1994 | Cunningham et al. | 360/103 |
| 5,299,079 A | 3/1994 | Kuroda | 360/103 |
| 5,359,480 A | 10/1994 | Nepela et al. | 360/103 |
| 5,396,386 A | 3/1995 | Bolasna et al. | 360/103 |
| 5,423,111 A | 6/1995 | Mori | 29/90 |
| 5,423,207 A | 6/1995 | Flechsig et al. | 73/104 |
| 5,497,085 A | 3/1996 | Tian et al. | 324/212 |
| 5,513,056 A | 4/1996 | Kawasaki et al. | 360/103 |
| 5,526,204 A | 6/1996 | French et al. | 360/103 |
| 5,527,110 A | 6/1996 | Abraham et al. | 374/5 |
| 5,636,086 A | 6/1997 | Bolasna et al. | 360/103 |
| 5,640,089 A | 6/1997 | Horikawa et al. | 324/212 |
| 5,677,812 A | 10/1997 | Cha | 360/103 |
| 5,689,064 A | 11/1997 | Kennedy et al. | 73/105 |
| 5,817,931 A | 10/1998 | Boutaghou | 73/105 |
| 5,872,311 A | 2/1999 | Schaenzer et al. | 73/105 |
| 5,929,326 A | 7/1999 | Imaino et al. | 73/105 |
| 5,942,680 A | 8/1999 | Boutaghou | 73/105 |
| 5,963,396 A | 10/1999 | Burga et al. | 360/103 |
| 6,003,364 A | 12/1999 | Yao et al. | 73/105 |
| 6,016,692 A | 1/2000 | Schaenzer et al. | 73/105 |
| 6,021,020 A * | 2/2000 | Itoh et al. | 360/236.1 |
| 6,023,394 A * | 2/2000 | Ito et al. | 360/235.7 |
| 6,105,421 A * | 8/2000 | Yao et al. | 73/105 |
| 6,130,808 A * | 10/2000 | Yotsuya | 360/235.4 |
| 6,233,119 B1 * | 5/2001 | Burga et al. | 360/236.9 |
| 6,239,951 B1 * | 5/2001 | Wang et al. | 360/236.8 |
| 6,275,467 B1 * | 8/2001 | Wang et al. | 369/300 |

* cited by examiner

GLIDE HEAD WITH A TRANSVERSE CONTACT RAIL

CROSS-REFERENCE TO PRIORITY APPLICATIONS

This application is a continuation-in-part and claims priority of U.S. patent application Ser. No. 09/382,279, filed Aug. 25, 1999, which is a continuation of and claims priority from U.S. patent application Ser. No. 08/831,878, filed Apr. 2, 1997, entitled "Glide Head With An Outside Active Rail" by Alexander A. Burga and Margelus A. Burga, now U.S. Pat. No. 5,963,396, which issued on Oct. 5, 1999, both of which are incorporated herein by reference.

FIELD OF THE INVENTION

This invention relates to glide heads used to detect defects on the surface of magnetic or magnetic-optical memory disks such as those used in hard disk drives.

BACKGROUND OF THE INVENTION

A computer hard disk drive comprises a magnetic memory disk mounted on a spindle which is driven by a motor to rotate the magnetic disk at high speed. A read/write head, kept in close proximity to the surface of the rotating magnetic disk, reads or writes data on the magnetic disk. The read/write head is separated from the surface of the magnetic disk by an air bearing created by the high speed rotation of the magnetic disk. The read/write head flies on this air bearing, e.g., at a height of approximately one microinch. The closer the read/write head is to the surface of the magnetic disk, the more information may be written on the disk. Thus, it is desirable for the read/write head to fly as close as possible to the surface of the magnetic disk.

Typical memory disks comprise a substrate that is plated with a hard material such as a nickel phosphorus alloy. The nickel phosphorus is then textured or roughened. An underlayer, a magnetic alloy or magnetic-optical material, and a protective overcoat are then deposited on the nickel phosphorus, e.g., by sputtering. As mentioned above, the disk manufacturing process leaves the surface of the disk in a slightly roughened condition.

The precision with which the read/write head flies over the magnetic disk requires that care is taken during manufacturing to assure that there are no protrusions or asperities on the disk surface that may interfere with the read/write head. A protrusion on the surface of the disk that contacts the read/write head during use may damage the head or the disk.

Accordingly, during manufacturing of magnetic or magnetic-optical disks, tests are performed with "glide heads" to determine if there are any asperities, voids or contamination that might interfere with the read/write head. Accurate testing of disks for such defects assures that the disk manufacturer does not unnecessarily reject good quality disks or pass on poor quality disks that may later fail.

Figure 1:
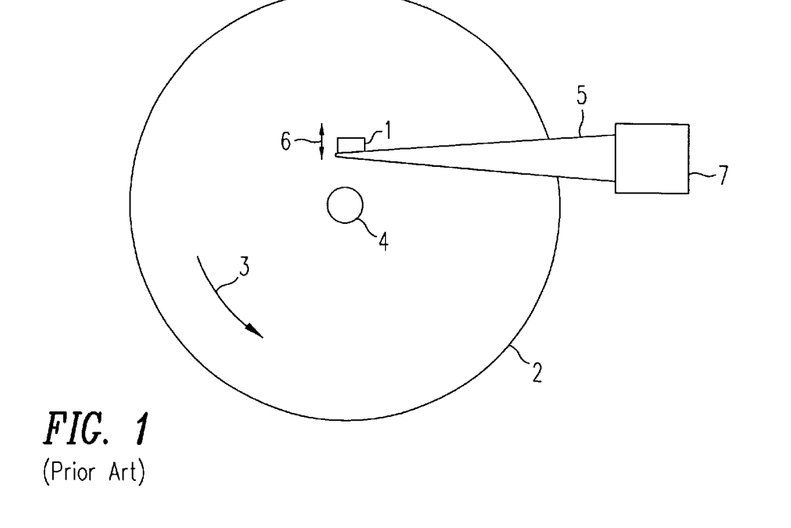
FIG. 1 illustrates in plan view a glide head connected to a suspension arm over a rotating magnetic disk in accordance with the prior art.

During testing, the glide head must fly over the surface of the disk at a height no greater than the minimum fly height of the read/write head. FIG. 1 illustrates a glide head 1 flying over the surface of a magnetic disk 2. Disk 2 spins in the direction of arrow 3 about a spindle 4. Glide head 1 is connected to a suspension arm 5, which maintains the position of glide head 1 relative to disk 2. Suspension arm 5 is controlled by an actuator 7, such as a stepper-motor actuator or a voice-coil actuator, which moves glide head 1 laterally over the surface of magnetic disk 2 in the direction of arrow 6. The lateral movement of glide head 1 is slow relative to the high speed rotation of magnetic disk 2. Similar to a read/write head, glide head 1 flies over an air bearing that is created by the high speed rotation of magnetic disk 2.

Figure 2:
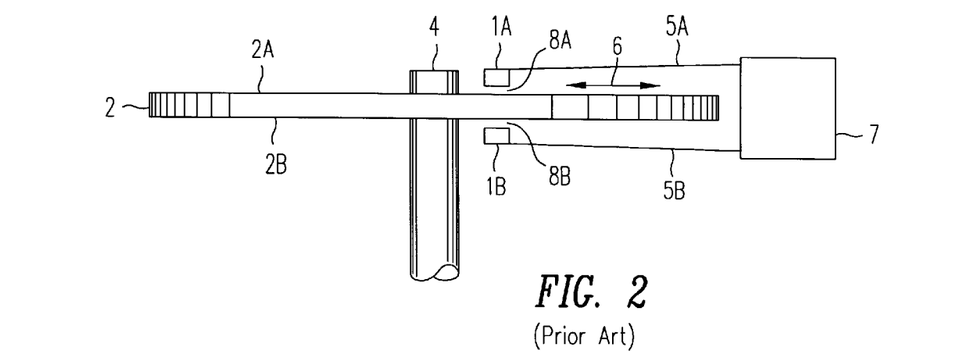
FIG. 2 is a side view of glide heads flying over both the top and bottom surfaces of a magnetic disk in accordance with the prior art.

FIG. 2 is a side view of magnetic disk 2 with a down facing glide head 1A and an up facing glide head 1B flying over and testing surfaces 2A and 2B of magnetic disk 2, respectively. Air bearings 8A, 8B, created by the high speed rotation of magnetic disk 2, lie between glide heads 1A and 1B and surfaces 2A and 2B, respectively. As in FIG. 1, glide heads 1A and 1B are connected to suspension arms 5A, 5B. Arms 5A, 5B are controlled by actuator 7 to laterally move glide heads 1A, 1B over surfaces 2A, 2B of magnetic disk 2 in the direction of arrow 6.

Figure 3:
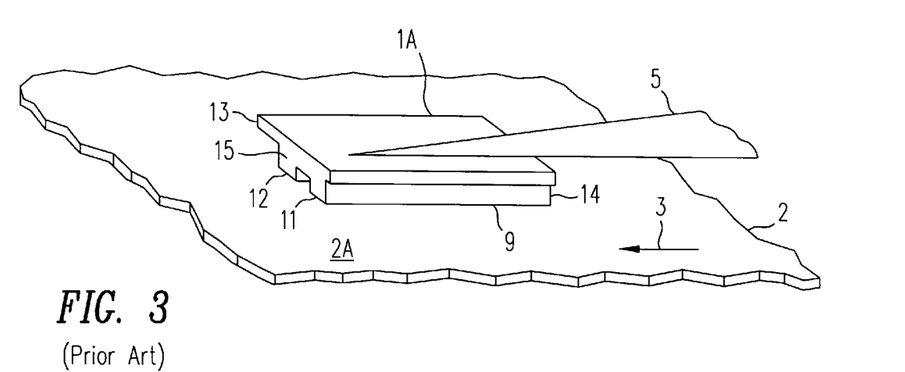
FIG. 3 is a perspective view of a glide head connected to a suspension arm over the rotating magnetic disk in accordance with the prior art.
Figure 4A:
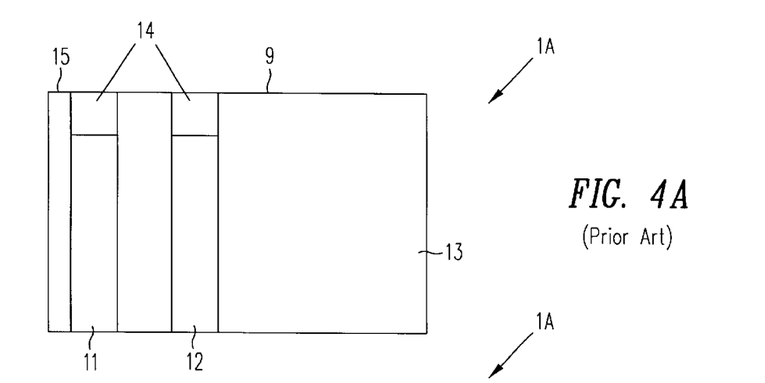
FIGS. 4A and 4B are bottom plan and end views, respectively, of a glide head in accordance with prior art.
Figure 4B:
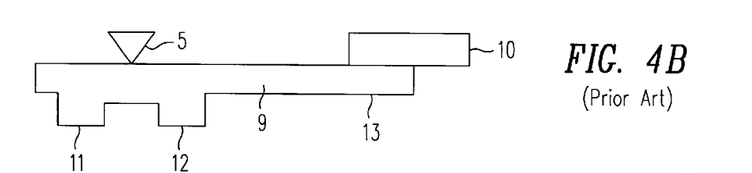

FIG. 3 shows glide head 1 flying over a section of magnetic disk 2 rotating in the direction of arrow 3. The roughened texture of top surface 2A of magnetic disk 2 is schematically shown in FIG. 3. FIG. 4A shows a bottom surface of down facing glide head 1A. FIG. 4B shows a trailing side 15 of down facing glide head 1A. As shown in FIGS. 4A and 4B, glide head 1A comprises a slider 9, a suspension arm 5 connected to a top surface of slider 9, and a transducer 10, such as a piezoelectric crystal. (Transducer 10 and suspension arm 5 are schematically represented in FIG. 4B.) Slider 9 comprises an inside rail 11, an outside rail 12, and a wing 13. Inside rail 11 and outside rail 12 both have forward tapered ends 14, which are tapered at an angle less than one degree from horizontal (typically an angle between thirty minutes and fifty minutes). Tapered ends 14 provide lift to glide head 1A. Wing 13 provides additional surface area to the top surface of slider 9 upon which transducer 10 is mounted. When rail 11 or 12 impact an asperity or contamination on disk 2 or sink in response to encountering a void, transducer 10 converts the mechanical energy from the event into an electrical signal which can be measured. Generally, however, inside rail 11 generates a stronger signal output voltage when detecting a defect than outside rail 12 when at the same fly height. Accordingly, it is difficult to determine when outside rail 12 is detecting a defect. Also, when a signal is generated by transducer 10, it is difficult to know the size of the defect that caused the signal, because one cannot know whether the signal was created by an encounter with the more sensitive inside rail 11 or the less sensitive outside rail 12.

Because tapered ends 14 of inside rail 11 and outside rail 12 create lift, it is important that as slider 9 moves laterally across the rotating surface of magnetic disk 2, both inside rail 11 and outside rail 12 remain over the surface of magnetic disk 2. In other words, one cannot move slider 9 such that outside rail 12 extends past the outer circumference of disk 2. If outside rail 12 is moved beyond the outer circumference of disk 2, slider 9 will lose its lift under outside rail 12 and will roll, causing slider 9 to contact magnetic disk 2. Accordingly, only outside rail 12 can detect asperities over the outermost portion of the surface of magnetic disk 2. Obviously, the surface of disk 2 adjacent the outer circumference must be tested for asperities. Thus, a glide head that can accurately test the outermost portion of the surface of a magnetic disk without losing its lift is needed.

The distance that slider 9 may move laterally outward along the surface of magnetic disk 2 is determined by the width of rails 11 and 12. In order to cover the entire surface area on magnetic disk 2, slider 9 is moved laterally, step by step, across the surface of magnetic disk 2. Each step must be at least slightly less than the width of one rail in order to test the entire surface of the disk for defects. Accordingly, in order to minimize the time necessary to test each magnetic disk, a glide head with wide rails is desirable.

SUMMARY

A glide head, in accordance with an embodiment of the present invention, includes first and second rails, and a transverse contact rail that is orientated orthogonally with the first and second rails and is located at or approximately at the trailing end of the glide head. The glide head flies with a positive pitch and, thus, the transverse contact rail at the trailing end of the glide head is the area on the glide head that is closest to the surface of a disk being tested. Thus, the mechanical energy is greatest when the transverse contact rail contacts a defect on a disk, and thus the transverse contact rail is the active rail. Because the transverse contact rail extends across the width of the glide head, the glide head may be stepped by large amounts when testing a disk, which decreases testing time and increases throughput. In addition, the transverse contact rail may extend beyond the first and second rails, i.e., from one side of the glide head to the other. The glide head with the transverse contact rail, advantageously, may be used to test both the inside diameter and outside diameter of a disk.

The first and second rails on the glide head may extend to and contact the transverse contact rail or only one or neither may contact the transverse contact rail. One rail may be shorter than the other rail if desired. In addition, the channel region defined between the first and second rails and a wing, if used, may be tapered so that they merge with the bottom surface of the transverse contact rail.

The glide head with the transverse contact rail may be manufactured using ion milling or machining.

A method of testing of a rotating disk includes placing over the surface of the disk a glide head with a transducer mounted on the top surface of the glide head and a transverse contact rail on the bottom surface of the glide head at approximately the trailing end; providing a relative motion between said surface of the disk and the glide head that causes the glide head to fly over the disk with a positive pitch such that said transverse contact rail is the closest area on the glide head to the surface of the disk; converting the mechanical energy from the transverse contact rail encountering a defect on the surface into an output signal, e.g., an electrical signal, from the transducer; and monitoring the output signal from the transducer.

BRIEF DESCRIPTION OF THE DRAWINGS

FIGS. 5A and 5B are bottom plan and end views, respectively, of a down facing outside active rail glide head in accordance with the invention.

FIGS. 5A-1 and 5B-1 are bottom plan and end views, respectively, of an up facing outside active rail glide head in accordance with the invention.

DETAILED DESCRIPTION

Figures 5A, 5A, 5B, 5B:
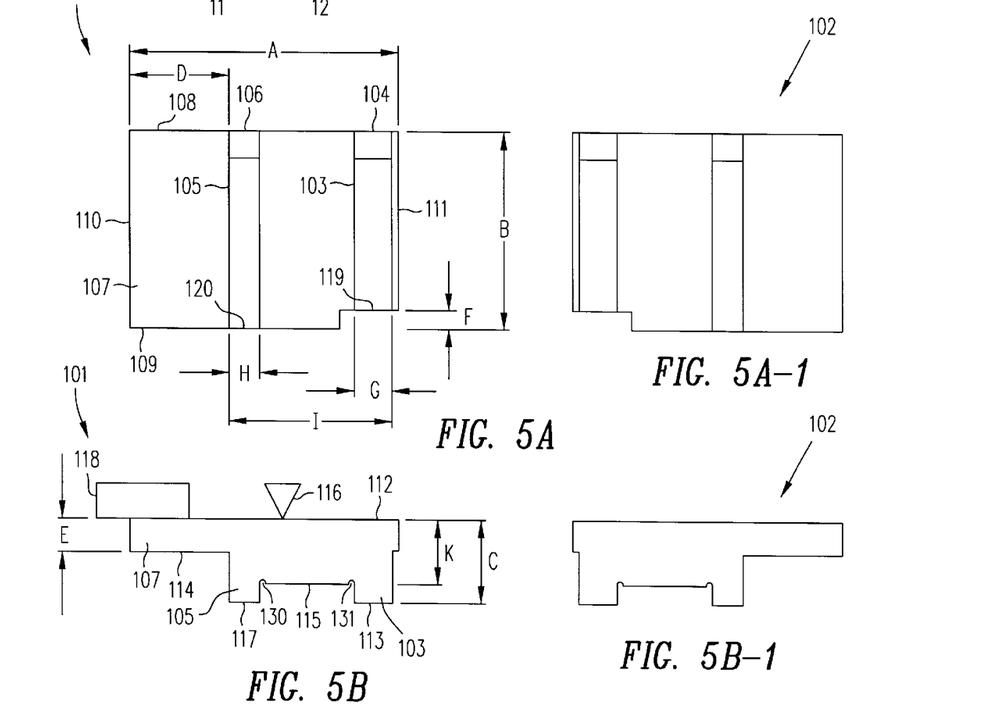

FIGS. 5A, 5A-1, 5B, and 5B-1 illustrate 50% sliders with an outside active rail. The term "50%" is well known in the art, and refers to the size of the slider. FIG. 5A is a bottom plan view of a down facing slider 101 and FIG. 5A-1 is a bottom plan view of a corresponding up facing slider 102. FIG. 5B is an end view of a down facing slider 101 and FIG. 5B-1 is an end view of a corresponding up facing slider 102. For simplicity, only down facing slider 101, illustrated in FIGS. 5A and 5B, will be discussed, but it should be understood that up facing slider 102 is similar to down facing slider 101, but in mirror image, as illustrated in FIGS. 5A-1 and 5B-1.

As shown in FIGS. 5A and 5B, slider 101 has an inside rail 103 and an outside rail 105. Both inside rail 103 and outside rail 105 have forward tapered ends 104 and 106, respectively. Forward tapered ends 104 and 106 have an angle of approximately sixty minutes from the horizontal. However, in other embodiments, other angles can be used, e.g., from thirty minutes to one degree. Slider 101 is approximately 0.10 inches in width from its outside edge 110 to inside edge 111 (distance A in FIG. 5A), 0.078 inches in length from its forward end 108 to trailing end 109 (distance B), and 0.024 inches high from top surface 112 to the air bearing surfaces 113, 117 of the rails 103, 105 (distance C). It should be understood, however, that all dimensions are merely by way of example, and the invention is not limited to a slider with these dimensions. Other sizes may be used.

Slider 101 has an extension or wing 107 that extends slider 101 outward from outside rail 105 approximately 0.040 inches (distance D), thereby increasing the area of top surface 112 of slider 101. Wing 107 is approximately 0.01 to 0.015 inches thick (i.e., distance E between top surface 112 of slider 101 and bottom surface 114 of wing 107). As can be seen in FIG. 5A, outside rail 105 is longer than inside rail 103. Outside rail 105 traverses the entire length of slider 101 from forward end 108 to trailing end 109 and is thus 0.078 inches long (distance B). Inside rail 103 extends to forward end 108, but is approximately 0.007 inches short of trailing end 109 of slider 101 (distance F). Thus, trailing end 120 of outside active rail 105 extends approximately 0.007 inches beyond trailing end 119 of inside rail 103. However, in other embodiments, outside active rail 105 extends beyond trailing end 119 of inside rail 103 by other distances, e.g., by a distance between 1% to 50% of the length of outside rail 105. In another embodiment, tapered forward end 104 of inside rail 103 may not extend to forward end 108 of slider 101, such that tapered forward end 106 of outside rail 105 extends some distance, e.g., approximately 0.007 inches, in front of tapered forward end 104 of inside rail 103.

Figure 6:
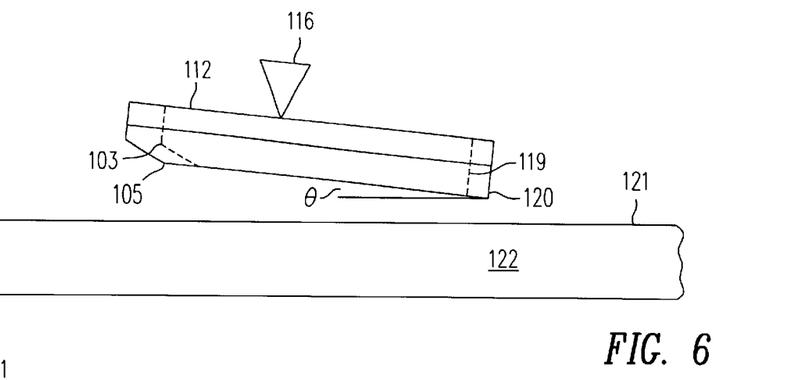
FIG. 6 is a side view of a slider connected to a suspension arm flying over the surface of a magnetic disk.

As shown in FIG. 6, as slider 101 flies over surface 121 of the rotating magnetic disk 122 at a positive pitch angle θ, which generally is approximately 0.015 degrees or less. Because slider 101 flies with a positive pitch, trailing ends 119 and 120 of the rails are the closest part of slider 101 to surface 121. Accordingly, trailing ends 119 and 120 are the areas on rails 103 and 105 that are most sensitive to defects on surface 121. Because trailing end 120 of outside rail 105 extends beyond trailing end 119 of inside rail 103 (shown in phantom in FIG. 6), outside rail 105 is closer to surface 121 of the disk. Thus, outside rail 105 is more sensitive than inside rail 103, making outside rail 105 the active rail and inside rail 103 the non-active rail.

Inside non-active rail 103, however, is wider than outside active rail 105 to compensate for the increased lift caused by the greater length of outside active rail 105. The wide inside rail 103 prevents slider 101 from rolling during flight. The width of rails 103 and 105 depends on the fly height requirements and the rotational velocity of magnetic disk 122. By way of example, with slider 101 flying at one microinch at a positive pitch of 0.03 degrees over magnetic disk 122, and disk 122 rotating beneath slider 101 such that the portion of disk 122 under slider 101 travels at 500 inches per second, inside non-active rail 103 may be approximately 0.015 inches wide (distance G) and outside active rail 105 may be approximately 0.012 inches wide (distance H). The distance between the outside edge of outside active rail 105 and the inside edge of inside non-active rail 103 is approximately 0.058 inches (distance I). The inside non-active rail 103 is set in from the inside edge 111 of slider 101 approximately 0.002 inches. The distance between top surface 112 of slider 101 and bottom surface 115 between rails 103 and 105 is approximately 0.02 inches (distance K).

Slider 101 is machined using standard machining methods out of a wafer of aluminum oxide-titanium carbide such as material type no. 310, available from 3M Corporation located in Minnesota. Notches 130 and 131 in bottom surface 115 of slider 101, as shown in FIG. 5B are created during the machining process.

Figure 7:
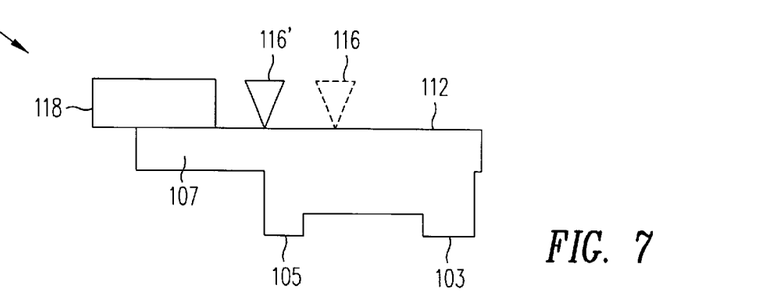
FIG. 7 is a side view of an up facing outside active rail glide head with an offset suspension arm.

Suspension arm 116 (FIG. 5B and FIG. 6) is connected to top surface 112 of slider 101 and provides a gram force on slider 101 toward surface 112. A typical gram force can be approximately 2, 3.5, 6, 9.5, or 15 grams. In an alternate embodiment, the width of inside rail 103 is not increased to compensate for the greater lift of outside rail 105. Instead, as illustrated in FIG. 7, suspension arm 116' may be offset on top surface 112 of slider 101 from the previous embodiment's location for suspension arm 116 (shown in phantom). Offsetting suspension arm 116' prevents roll induced by the additional lift generated from outside rail 105, which is longer than inside rail 103. Thus, in this embodiment, inside rail 103 may have the same width as outside rail 105. An appropriate suspension system arm is a type 2, 4, 13, 18.50 or 19 model available from Magnecom, Inc. of San Diego. A piezoelectric crystal (PZT) 118 (FIG. 5B and FIG. 7) is mounted to top surface 112 of wing portion 107 of slider 101. An appropriate PZT crystal should be of good quality such as is available from Secor, Ltd. located in the United Kingdom.

Figure 8:
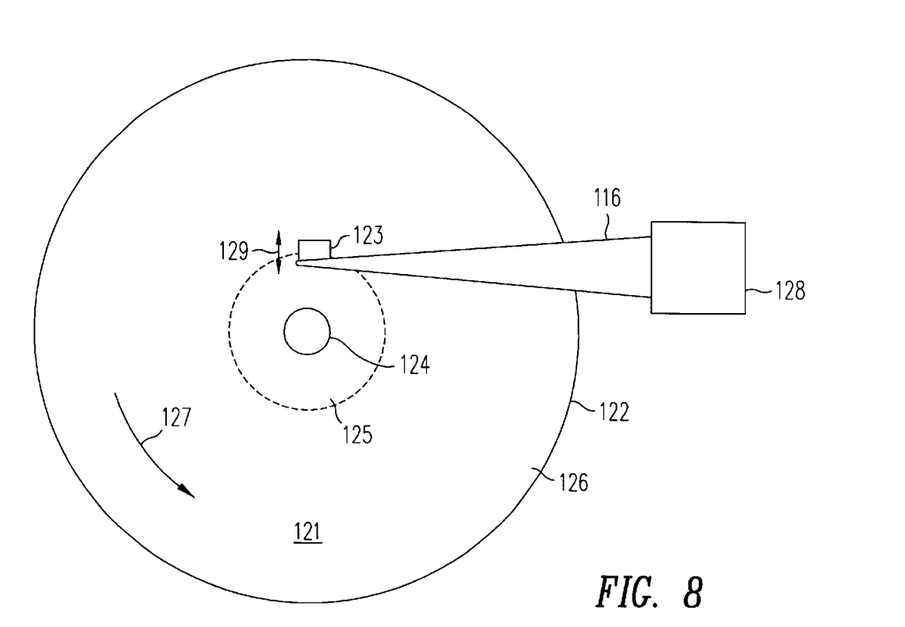
FIG. 8 illustrates in plan view a glide head connected to a suspension arm over the rotating surface of a magnetic disk.

FIG. 8 illustrates an assembled glide head 123 mounted on a suspension arm 116 and over a magnetic disk 122 to be tested. Disk 122 has a landing zone 125 adjacent an inner perimeter of surface 121, near a spindle 124. A data zone 126, where data is stored on magnetic disk 122, is outward from landing zone 125 on surface 121. When magnetic disk 122 is not rotating there is no air bearing generated over surface 121 and glide head 123 rests on surface 121 in landing zone 125. As magnetic disk 122 begins rotation as indicated by arrow 127, an air bearing is generated over surface 121 and lift is provided to glide head 123 by the air bearing. A typical rotational velocity of disk 122 produces a linear velocity of 300 to 500 inches per second beneath glide head 123 during testing. Glide head 123 first tests the landing zone for defects. Magnetic disk 122 rotates at high speed creating a high fly height for glide head 123 during testing of landing zone 125. A concentric circle in the landing zone 125 is tested by glide head 123. An actuator 128 moves glide head 123 laterally across data zone 125 as indicated by arrow 129 so that another concentric circle in landing zone 125 may be tested. When glide head 123 has completed testing landing zone 125 for defects, actuator 128 continues to move glide head 123 laterally across surface 121 into data zone 126. The rotation of magnetic disk 122 is then slowed so that glide head will have a lower fly height, approximately one microinch, during testing of the data zone 126. Actuator 128 continues to move glide head 123 across data zone 126 until the entire area of surface 121 has been tested. Actuator 128 moves glide head 123 laterally across surface 121 by a distance less than the width of outside rail 105. In this manner glide head 123 tests, step by step, the entire area of surface 121 for defects.

Figure 9A:
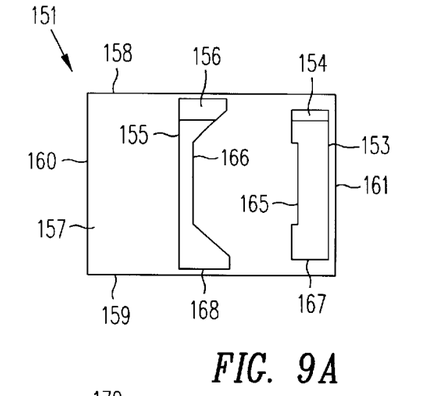
FIGS. 9A and 9B are plan and end views, respectively, of an outside active rail glide head with notches in the rails.
Figure 9B:
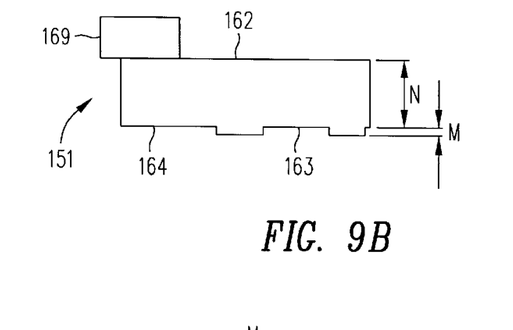

Another embodiment of a slider is shown in FIGS. 9A and 9B. FIGS. 9A and 9B show an ion milled 50% slider with an outside active rail. The 50% slider is illustrated as an example, and any size slider may be made in accordance with this embodiment. The slider body in this embodiment may be manufactured by conventional ion milling. FIG. 9A is a bottom plan view of a down facing 50% slider 151. FIG. 9B is an end view of down facing slider 151. For the sake of simplicity, only down facing slider 151 will be discussed, but it should be understood that a corresponding up facing slider is similar to down facing slider 151, but in mirror image.

In this embodiment, the overall dimensions of slider 151 are similar to the dimensions of slider 101 in FIGS. 5A and 5B. Because slider 151 is ion milled, however, inside non-active rail 153 and outside active rail 155 are only raised approximately 0.0002 inches from a bottom surface 163 (FIG. 9B) of slider 151 (distance M). Accordingly, only minimal material is removed from slider 151 and wing 157, which extends slider 151 outward from outside active rail 155. Thus, slider 151 and wing 157 are thicker than slider 101 and wing 107 (FIGS. 5A and 5B) of the previous embodiment. The distance between top surface 162 of slider 151 and bottom surface 163 of slider 151 between the two rails 153 and 155 is the same distance from top surface 162 of slider 151 and bottom surface 164 of wing 157, approximately 0.035 inches (distance N). The additional thickness in slider 151 and wing 157 increases the overall stiffness. The additional stiffness increases the signal strength of PZT crystal 169, and causes a higher frequency output thereby improving the detection of small defects.

Outside rail 155 is longer than inside non-active rail 153. Trailing end 168 of outside rail 155 extends beyond trailing end 167 of inside rail, again making outside rail 155 the active rail. In addition, as illustrated in FIG. 9A, forward tapered end 156 of outside rail extends beyond forward tapered end 154 of inside rail 153. In this embodiment, the sides of outside active rail 155 and inside nonactive rail 153 have notches. Outside active rail 155 has a "V" shaped notch 166 on the inside edge. Inside non-active rail 153 has a "U" shaped notch 165 on the outside edge. Notches 165 and 166, however, do not extend to tapered ends 154 and 156, nor to trailing ends 167 and 168. These notches 165 and 166 stabilize slider 151 during flight, preventing slider 151 from rolling. Notches 165 and 166 decrease the area of rails 153 and 155 as needed for fly height requirements, while still providing the same amount of lift from tapered forward ends 154 and 156. Notches 165 and 166 do not extend to trailing ends 167 and 168 permitting trailing ends 167 and 168 to remain wide. Because slider 151 is moved laterally across the surface of the magnetic disk in steps equal to the width of trailing end 168 of outside rail 155, keeping trailing end 168 wide minimizes testing time. In this embodiment, notches 165 and 166 are formed during the conventional ion milling process. However, it is understood that these notches can be formed using other methods, such as conventional machining. It is further understood that notches 165 and 166 may have shapes other than as described above.

Figure 10A:
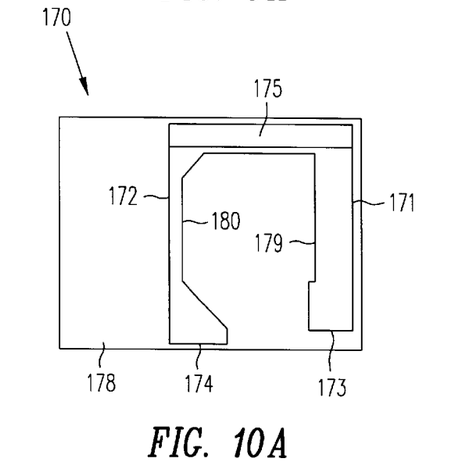
FIGS. 10A, 10B and 10C are plan, end and side views, respectively, of an outside active rail glide head with notches in the rails and connected forward tapered ends.
Figures 10B, 11:
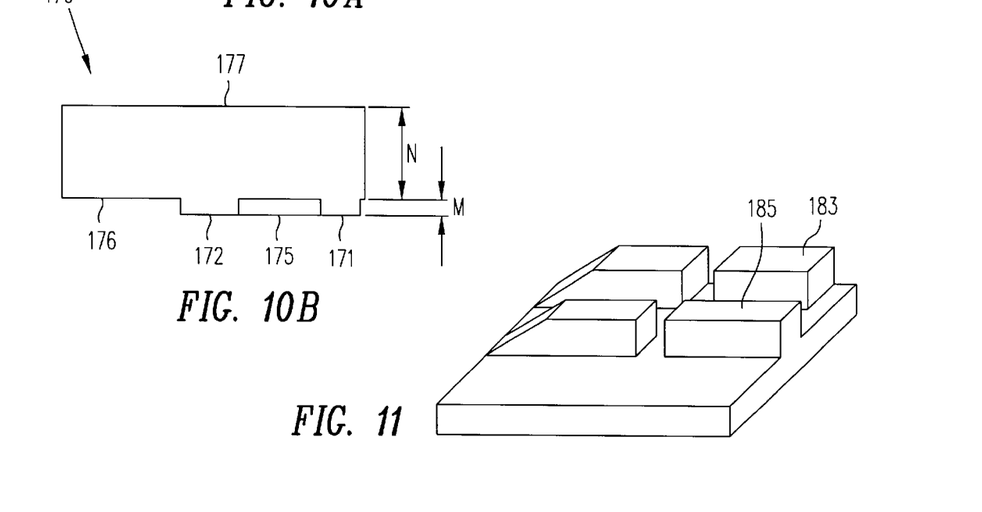
FIG. 11 is a perspective view of an outside active rail glide head with discontinuities in both the inside rail and the outside rail.
Figure 10C:
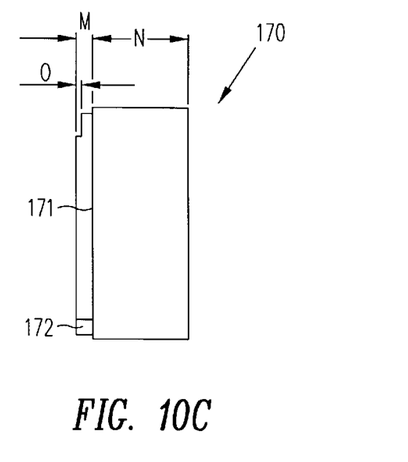

FIGS. 10A, 10B and 10C illustrate another embodiment of a slider in accordance with the present invention. FIGS. 10A, 10B and 10C show a 50% slider. The 50% slider is illustrated as an example, and any size slider may be made in accordance with this embodiment. The slider body in this embodiment may be manufactured by conventional ion milling. FIG. 10A is a bottom plan view of a down facing 50% slider 170. FIG. 10B is an end view of down facing slider 170 and FIG. 10C is a side view of down facing slider 170. For the sake of simplicity, only down facing slider 170 will be discussed, but it should be understood that a corresponding up facing slider is similar to down facing slider 170, but in mirror image.

This embodiment has approximately the same dimensions as the embodiment shown in FIGS. 9A and 9B. As with slider 151, because slider 170 is ion milled inside rail 171 and outside rail 172 are only raised approximately 0.0002inches from a bottom surface 176 (FIG. 10B) of slider 170 (distance M). Further, the distance between top surface 177 of slider 170 and bottom surface 176 of slider 170 between rails 171 and 172 is the same distance from top surface 177 and bottom surface 176 of wing 178, approximately 0.035 inches (distance N). As in slider 151, slider 170 has notches 179 and 180 in the sides of rails 171 and 172.

Trailing end 174 of outside rail 172 extends beyond trailing end 173 of inside non-active rail 171, again making outside rail 172 the active rail. In this embodiment, however, the forward end of inside rail 171 extends as far forward as the forward end of outside rail 172 and the forward ends of inside rail 171 and outside rail 172 are connected such that there is one forward end 175 that connects outside rail 172 with inside rail 171. Forward end 175 serves to increase stability of slider 170 in flight. Forward end 175 has a step type taper of approximately 0.0001 inches (distance O), as illustrated in FIG. 10C. In another embodiment, forward end 175 may have a beveled taper with an angle between thirty minutes to one degree.

Figure 12:
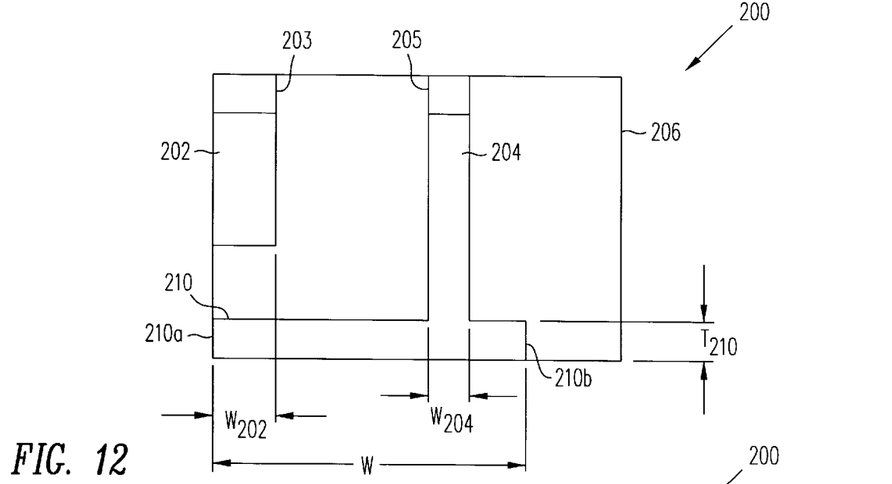
FIGS. 12 and 13 show bottom and front views, respectively, of a glide head with a transverse contact rail in accordance with another embodiment of the present invention.
Figure 13:
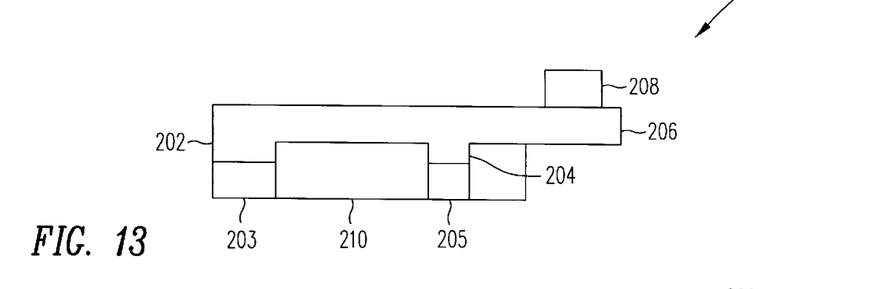

FIGS. 12 and 13 show bottom and front views, respectively, of a glide head 200 in accordance with another embodiment of the present invention. Glide head 200, as shown in FIG. 12, includes an inside rail 202 and an outside rail 204, each with a tapered leading end 203 and 205, respectively. Glide head 200 may include a wing 206, as shown in FIGS. 12 and 13, upon which is mounted a transducer 208, such as a PZT crystal. As shown in FIG. 12, glide head 200 includes a transverse contact rail 210 at the trailing end 201 of glide head 200 that extends from inside rail 202 to outside rail 204 and beyond. As shown in FIG. 12, outside rail 204 may extend to and contact transverse contact rail 210, while inside rail 202 does not. Transverse contact rail 210 extends across the width of glide head 200 a distance W, which may be much greater than the width of either rail 202 or 204, i.e., widths $W_{202}$ or $W_{204}$, individually or combined. As with the embodiment described in reference to FIGS. 5A and 5B, the inside rail 202 may be shorter and wider than the outside rail 204.

The transverse contact rail 210 on glide head 200 is sensitive to any defects on a disk being tested. Because glide head 200 flies with a positive pitch, as discussed in reference to FIG. 6, transverse contact rail 210 is the closest area on glide head 200 to the surface of a disk being tested. Rails 202 and 204 provide lift and stability to glide head 200 and may detect large defects, but transverse contact rail 210 is the lowest portion of glide head 200 when flying, and thus, transverse contact rail 210 serves as the active rail. When the inside rail 202 is shorter than the outside rail 204, as shown in FIG. 12, inside rail 202 may contact only very large defects, while outside rail 204 and particularly transverse contact rail 210 will contact, i.e., be more sensitive to, smaller defects. Thus, mechanical energy produced by transverse contact rail when encountering a defect is converted into an output signal, e.g., an electrical signal, by transducer 208. The output signal from transducer 208 may be monitored to determine when a defect is present on the surface of the disk.

Because transverse contact rail 210 is wider than either inside rail 202 or outside rail 204, transverse contact rail 210 advantageously increases the area on glide head 200 that may detect a defect on a disk. With the use of transverse contact rail 210, glide head 200 may detect a defect over the width W, rather than being limited to the width of one or two rails. Consequently, when glide testing a disk, glide head 200 can be stepped by up to the width W of transverse contact rail 210, thereby increasing throughput. In addition, with transverse contact rail 210 extending to or past the inside rail 202 and the outside rail 204, glide head 200 can test both the outside diameter and inside diameter of a disk. This is particularly advantageous with smaller disks, such as 1 inch disks, which require the entire surface to be tested.

Glide head 200 may be, for example, a 50% slider, with transverse contact rail 210 having a width W of e.g., 0.60 inches and a thickness of $T_{210}$ of, e.g., 0.002 inches. Glide head 200 flies with a pitch of 0.015 degrees or less. The thickness of transverse contact rail 210 may be increased, however, with increased thickness additional lift is provided to the trailing end 201 of glide head 200. Transverse contact rail 210 may have any desired width including the width of the entire device (including the width of wing 206), i.e., approximately 0.10 inches. Glide head 200 may be manufactured by ion milling or any other appropriate method.

The roll of glide head 200 must be calibrated so that one side of transverse contact rail 210 is not much closer to the surface of a disk being tested that the other side of the transverse contact rail 210. Calibration of the roll is performed for each individual glide head 200 by mounting the glide head 200 on a suspension arm (not shown) and measuring the fly height of both sides of transverse contact rail 210, for example, using a fly height tester. An appropriate suspension arm is, for example, a type 2, 4, 13, 18.50 or 19 model available from Acropolis, Inc. of San Diego. The suspension arm is bent or twisted until both sides of transverse contact rail 210 are flying at approximately the same fly height. The suspension arm may be adjusted by hand using, for example, tweezers or by a machine, e.g., manufactured by Martronics, Inc. of Minnesota, which adjusts the suspension arm for pitch and roll. Because the transverse contact rail 210 is the lowest flying area of glide head 200, the roll of the glide head 210 is adjusted so that both ends 210a and 210b of transverse contact rail 210 are within the fly height specification. For example, if the actual fly height of glide head 200 must be within ±0.1µ" of the desired fly height both ends 210a and 210b of transverse contact rail 210 must be ±0.1µ" of the fly height.

Figure 14:
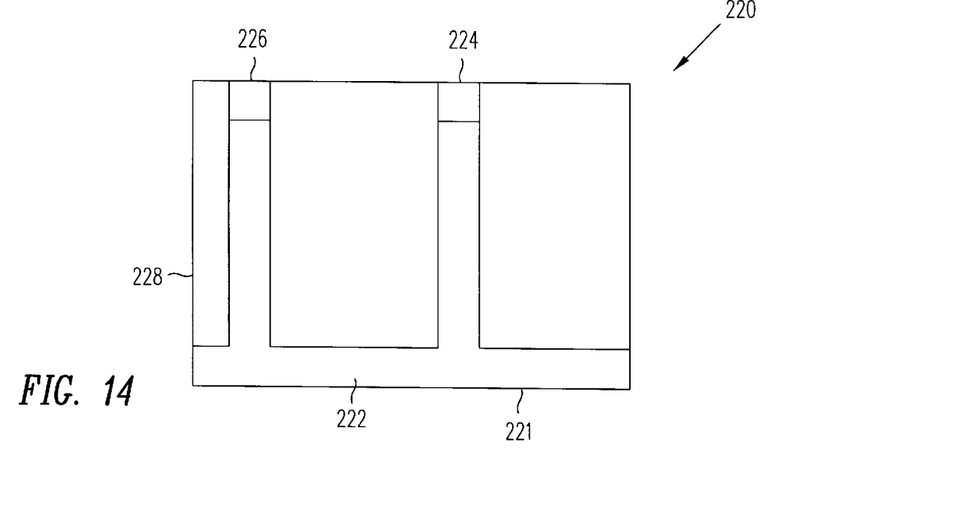
FIG. 14 shows a bottom view of a glide head with a transverse contact rail, in accordance with another embodiment of the present invention.

FIG. 14 shows a bottom view of glide head 220 in accordance with another embodiment of the present invention. As shown in FIG. 14, glide head 220 is similar to glide head 200 and includes a transverse contact rail 222 on the trailing end 221 of glide head 220 and that extends the entire width of glide head 220. In addition, both the outside rail 224 and the inside rail 226 extend to and make contact with transverse contact rail 222. As shown in FIG. 14, transverse contact rail 222 extends to the edge 228 of glide head 220, and thus, transverse contact rail extends beyond inside rail 226.

Figure 15:
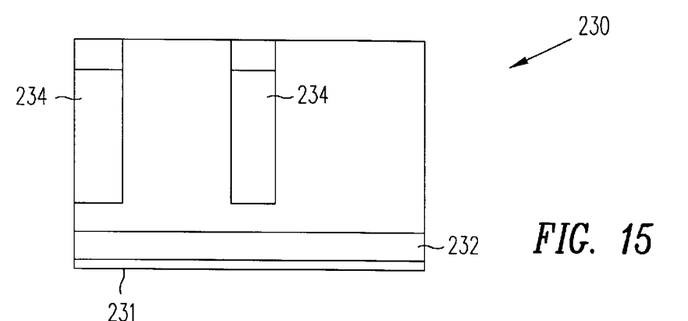
FIG. 15 shows a bottom view of a glide head with a transverse contact rail, in accordance with another embodiment of the present invention.

In another embodiment, as shown in FIG. 15, a glide head 230 includes a transverse contact rail 232 and neither inside rail 234 nor outside rail 236 extend to transverse contact rail 232. As shown in FIG. 15, transverse contact rail 232 is at approximately the trailing end 231 of glide head 230 but does not necessarily need to be precisely at the trailing end 231. Because glide head 230 flies with a positive pitch, transverse contact rail 232 will be the lowest area on glide head 230 even if transverse contact rail 232 is not at the trailing end 231. Thus, for example, transverse contact rail 232 may be a distance of up to 0.020 inches or more from the trailing end 231.

Figures 16, 17:
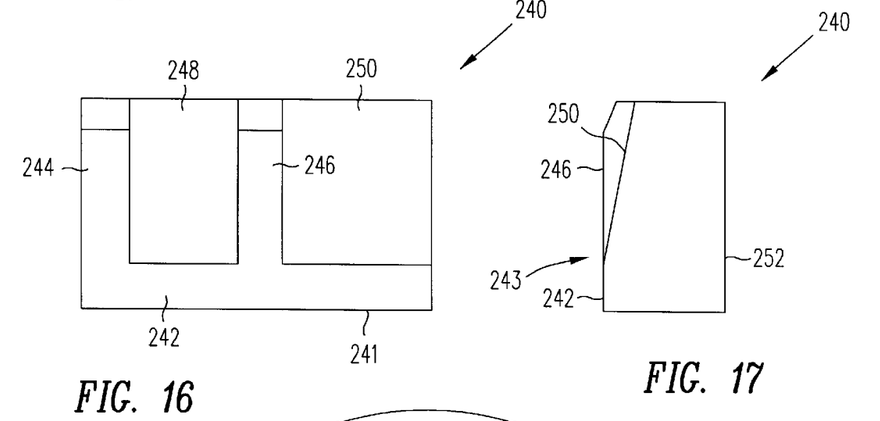
FIGS. 16 and 17 show bottom and side views, respectively, of a glide head with a transverse contact rail, in accordance with another embodiment of the present invention.

FIGS. 16 and 17 show bottom and side views, respectively, of glide head 240 in accordance with another embodiment of the present invention. Glide head 240 includes a transverse contact rail 242 at the trailing end 241 of glide head 240, to which inside rail 244 and outside rail 246 extend. A channel region 248 defined between rails 244 and 246 and the wing 250 are tapered such that they join the bottom surface 243 of transverse contact rail 242. With a tapered channel region 248 and wing 250, glide head 240 may be manufactured using conventional machining processes, which for example, cut tapered channel region 248 and wing 250 into the bottom surface of the body 252 of glide head 240.

Figure 18:
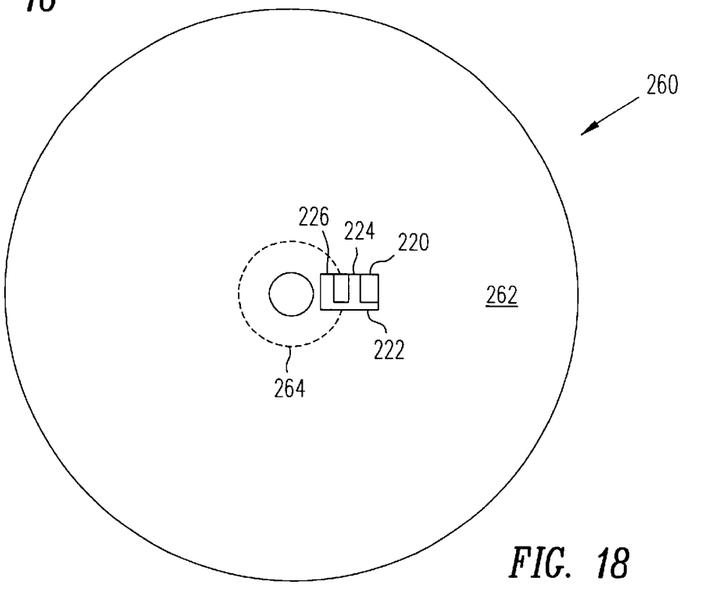
FIG. 18 shows a top view of a rotating disk with a glide head with a transverse contact rail flying over the surface of the disk.

FIG. 18 shows a top view of a disk 260 with glide head 220 flying over the surface 262. It should be understood, that while the top view of glide head 220 is shown in FIG. 18, rails 224, 226 and extension 222 are shown for the sake of clarity. Because transverse contact rail 242 extends the width of glide head 220, glide head 220 can advantageously detect defects on the inside diameter of disk 260 as well as the outside diameter of disk 260. Thus, glide head 220 can test an area of disk 260, i.e., the inside diameter illustrated by broken line 264, which would not be possible to test using a single active rail glide head, such as that described in reference to FIGS. 5A and 5B. Moreover, glide head 220 may be stepped across the surface 262 of disk 260 by an amount much greater than the width of one rail, e.g., approximately half the width to the full width of transverse contact rail 222, thereby decreasing the time required to glide test disk 260 and increasing throughput.

In addition, an improved signal output, i.e., increased strength of the signal, has been seen with glide heads having a transverse contact rail. While it is not thoroughly understood why signal output is improved with a transverse contact rail, one possible reason is increased stiffness provided by the transverse contact rail.

Although the present invention is illustrated in connection with specific embodiments for instructional purposes, the present invention is not limited thereto. Various adaptations and modifications may be made without departing from the scope of the invention. For example, the slider material is not limited to aluminum oxide-titanium carbide. The slider surface may be coated with carbide by sputtering or other similar techniques to increase the durability of the slider. Different sizes and dimensions of the slider may be used. Different types of suspensions, and transducers other than piezoelectric crystals may be used. Also as shown in FIG. 11, inside rail 183 and outside active rail 185 need not be continuous and may have gaps or other discontinuities in them. In lieu of providing tapers, one can provide steps in the forward ends of the rails. Accordingly, all such changes came within our invention.

What is claimed is:

1. A glide head comprising:
   a body having a top surface, a bottom surface, a leading end and a trailing end;
   a first rail on said bottom surface, said first rail extends in a direction extending from said leading end to said trailing end;
   a second rail on said bottom surface, said second rail extends in said direction extending from said leading end to said trailing end; and
   a transverse contact rail on said bottom surface, said transverse contact rail being at approximately the trailing end of said glide head and extending in a direction orthogonal to said first rail and said second rail and beyond said first rail towards a side of said body adjacent said first rail, said transverse contact rail extending in both directions with respect to said first rail.

2. The glide head of claim 1, wherein said transverse contact rail extends beyond said first rail and said second rail.

3. The glide head of claim 1, wherein said second rail is in contact with said transverse contact rail.

4. The glide head of claim 1, wherein said second rail is longer than said first rail and said second rail extends towards said trailing end of said glide head further than said first rail.

5. The glide head of claim 1, wherein said first rail and said second rail are in contact with said transverse contact rail.

6. The glide head of claim 5, said glide head further comprising a channel defined between said first rail and said second rail, said channel being tapered to join the bottom surface of said transverse contact rail.

7. The glide head of claim 1, further comprising:
   a wing outwardly extending said top surface of said glide head from said second rail, said wing extending from said leading end of said glide head to said trailing end of said glide head;

wherein said transverse contact rail extends across at least a portion of said wing.

8. The glide head of claim 7, wherein said transverse contact rail extends across at least a portion of said wing, said glide head further comprising a channel defined between said first rail and said second rail, wherein said wing and said channel are tapered to join the bottom surface of said transverse contact rail.

9. The glide head of claim 1, wherein said transverse contact rail extends across an entire width of said trailing end.

10. A glide head for detecting defects on the surface of a rotating disk, said glide head comprising:

a body having a top surface, a bottom surface, a leading end and a trailing end;

a first rail and a second rail on said bottom surface, said first rail and said second rail extend in a direction from said leading end to said trailing end, said first rail having a first width and said second rail having a second width; and means for contacting defects on said surface of a rotating disk, said means being at approximately the trailing end of said body and having a contact area greater than said first width or said second width and extending beyond said first rail towards a side of said body adjacent said first rail, said means extending in both directions with respect to said first rail.

11. The glide head of claim 10, wherein said means for contacting defects comprises a transverse contact rail, said transverse contact rail being orientated orthogonally to said first rail and said second rail.

12. The glide head of claim 11, wherein said first rail and said second rail have tapered leading ends, wherein said glide head flies over said surface of said rotating disk with a positive pitch making said transverse contact rail the closest area on said glide head to said surface of said disk.

13. A glide head comprising:

a body having a top surface, a bottom surface, a leading end and a trailing end;

a first rail on said bottom surface, said first rail extends in a direction extending from aid leading end to said trailing end;

a second rail on said bottom surface, said second rail extends in said direction extending from said leading end; and a transverse contact rail on said bottom surface, said transverse contact rail being approximately the trailing end of said glide head and extending in a direction orthogonal to said first rail and said second rail wherein said first rail and second rail are in contact with said transverse contact rail.

14. A glide head compromising:

a body having a top surface, a bottom surface, a leading end and a trailing end;

a first rail on said bottom surface, said first rail extends in a direction extending from said leading end to said trailing end;

a second rail on said bottom surface, said first rail extends in a direction extending from said leading end to said trailing end;

a transverse contact rail on said bottom surface, said transverse contact rail being at approximately the trailing end of said glide head and extending in a direction orthogonal to said first rail and said second rail; and a wing outwardly extending said top surface of said glide head from said second rail, said wing extending from said leading end of said glide head to said trailing end of said glide head;

wherein said transverse contact rail extends across at least a portion of said wing.

15. A glide head comprising:

a body having a top surface, a bottom surface, a leading end and a trailing end;

a first rail on said bottom surface, said first rail extends in a direction extending from said leading end to said trailing end;

a second rail on said bottom surface, said second rail extends in said direction extending from said leading end to said trailing end; and a transverse contact rail on said bottom surface, said transverse contact rail being at approximately the trailing end of said glide head and extending in a direction orthogonal to said first rail and said second rail and across an entire width of said trailing end.

* * * * *